Aug. 22, 1933.  J. A. MacLEAN  1,923,737
WATER GAUGE
Filed July 7, 1930

INVENTOR
John A. MacLean
BY
ATTORNEYS

Patented Aug. 22, 1933

1,923,737

UNITED STATES PATENT OFFICE 1,923,737

WATER GAUGE

John A. MacLean, Detroit, Mich., assignor to Wright-Austin Company, Detroit, Mich., a Corporation of Michigan Application July 7, 1930. Serial No. 466,142

1 Claim. (Cl. 73—54)

This invention relates to gauges especially adapted for indicating the water level in boilers, and its object is to provide means whereby the gauge glass and its connections are relieved of all strains due to boiler pressure and expansion and contraction caused by the sudden application of heat to these parts in use. A further object is to provide a construction especially adapted to gauges wherein the gauge glass is set at an inclination to the perpendicular for the purpose of showing the water level when the glass is viewed from a distance and from a point other than in front of the gauge, and to also provide a construction especially adapted to the employment of more than one glass together with shut off valves, whereby upon breakage of one glass, the other is available for use in determining the water level.

With the above and other ends in view, the invention consists in providing a tubular member extending parallel with the glass or glasses and connecting the valvular fittings or headers between which the glass or glasses extend, such tubular member being arranged to receive and form a passage for the hot water and vapor when admitted to said gauge for operation, so that expansion due to heat application will be distributed. The invention further consists in providing certain other new and useful features in the construction and arrangement of parts, all as hereinafter set forth and more particularly pointed out in the appended claim, reference being had to the accompanying drawing in which—

In water gauges as commonly constructed, the fittings into which the ends of the water glass are set and through which fittings the hot water and vapor flows to the glass, are independent of each other, being connected by the water glass only and therefore, boiler pressure in the glass tends to force the fittings away from the ends of the glass, causing leaks and putting the glass under heavy strains. Further, steam and water from the boiler flowing through these fittings and connections, heats the same, causing expansion which puts the glass under further strains, causing breakage.

Figure 1:
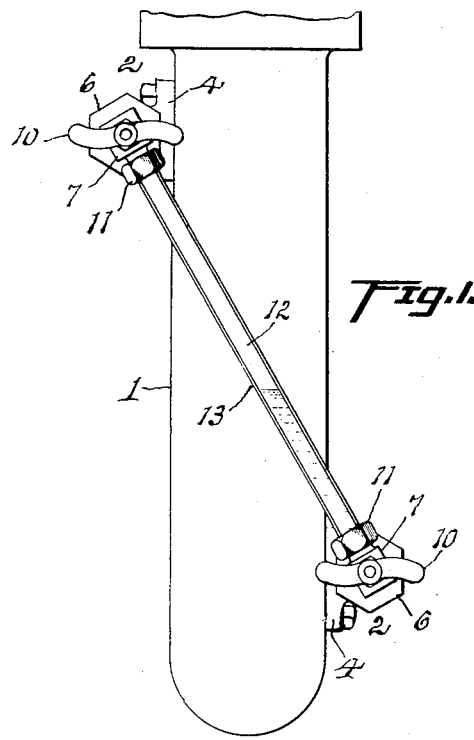
Figure 1 is a front elevation of a water column with a gauge illustrative of an embodiment of the present invention applied thereto.
Figure 2:
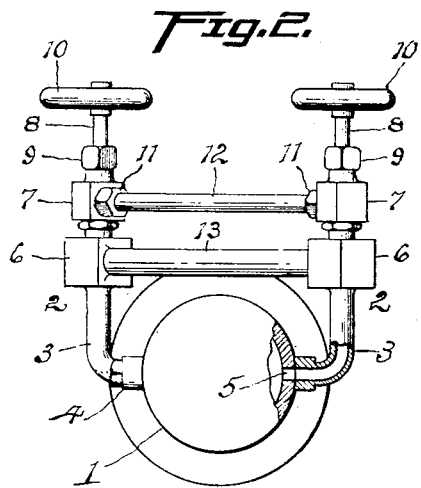
Fig. 2 is an elevation of the lower end of Fig. 1 with parts in section.

As illustrated in Figs. 1 and 2 of the accompanying drawing, 1 indicates a water column of the usual or any desired construction to which the water gauge illustrative of an embodiment of features of the present invention is applied, it being understood that the present gauge may be applied to the drum of the boiler or other suitable place of attachment to indicate the water level in the boiler.

The gauge comprises top and bottom fittings each indicated as a whole by the numeral 2 and each formed with a tubular arm 3 bent laterally adjacent its inner end and formed with an integral flange 4 for securing the fitting to a side wall of the column 1 by means of tap screws with these arms in open communication with the column 1 through openings 5 in the column wall, and on its outer end, each arm is formed with an integral head 6, which heads are tapped or otherwise formed opposite the open ends of the tubular arms, said heads being formed with a chamber or hollow, to receive the stem of a valve body or head 7 formed in any suitable manner to provide a seat for the usual valve, (not shown) having a stem 8 extending outward through a stuffing box 9 and provided on its outer end with a lever 10 or other suitable means to which may be attached the usual full chains (not shown) for turning said stems from below and at a considerable distance from the gauge, according to the usual practice of operating these valves. Each valve body 7 is also formed or provided with the usual connection 11 forming a seat to receive and hold one end of a glass water tube 12 which extends from one valve body to the other to show the level of water in the boiler when the valves are opened.

As shown, one of the fittings 2 is secured to the side of the column near the lower end thereof and the other fitting is secured to the opposite side of the column near the upper end thereof, and therefore the glass tube extends diagonally across the column in spaced relation thereto, and in an inclined position so that the level of water in the tube may be readily observed by the operator standing below and at a considerable distance from the gauge where the boiler setting is some forty feet high, as in some instances.

To relieve the glass tube of strains which would otherwise be imposed thereon by pressure in the tube tending to force in opposite directions, the valve bodies in which the ends of the tube are mounted, the heads 6 of the fittings 2 are connected by a tube 13 which extends parallel with the glass tube and rigidly connects the fittings, said tube being formed integral at its ends with said heads 6 as shown, or rigidly secured thereto in any suitable manner. This tube 13 thus forms a rigid connection between the fittings 2 to prevent their separation under boiler pressure and relieves the glass tube 12 from this strain which would otherwise be imposed thereon and which would tend to break the glass. Further, as this tubular connection 13 opens at its ends into the chambers of the heads 6, it forms a passage connecting the fittings 2 through which the water and steam may circulate to heat up the parts and cause them to expand equally with the glass and its connections, thus further relieving the glass from strains which would be imposed thereon by such expansion and also prevent leakage at the glass tube seats.

The construction shown in the accompanying drawing embodies a member connecting the fittings for the support of the gauge, and the same may be embodied in other constructions without departing from the spirit of the invention as set forth in the appended claim. I do not, therefore, limit myself to the particular construction shown.

Having thus fully described my invention, what I claim is:—

In combination with a water gauge including valve casings and a glass tube connected at its ends to said casings, of a mounting comprising hollow heads upon which said valve casings are mounted in communication with the interior of said heads, a tubular arm on each head opening into said head and adapted for attachment at its opposite end to and in communication with a boiler, and a tubular member connecting said heads to form a connecting strut and in open communication at its ends with the interior of said heads to form a fluid passage in open communication with the boiler and adjacent to but independent of said valve casings and gauge glass.

JOHN A. MacLEAN.